United States Patent
Brice et al.

(10) Patent No.: US 8,453,733 B2
(45) Date of Patent: Jun. 4, 2013

(54) METHOD TO CONTROL DRIVING FLUID BREAKTHROUGH DURING PRODUCTION OF HYDROCARBONS FROM A SUBTERRANEAN RESERVOIR

(76) Inventors: Bradley W. Brice, Anchorage, AK (US); Giovanna Boccardo, Anchorage, AK (US); Bernard Tremblay, Regina (CA)

(*) Notice: Subject to any disclaimer, the term of this patent is extended or adjusted under 35 U.S.C. 154(b) by 260 days.

(21) Appl. No.: 12/846,480

(22) Filed: Jul. 29, 2010

(65) Prior Publication Data

US 2011/0024115 A1 Feb. 3, 2011

Related U.S. Application Data

(60) Provisional application No. 61/230,443, filed on Jul. 31, 2009.

(51) Int. Cl.
| | |
|---|---|
| E21B 33/138 | (2006.01) |
| E21B 43/20 | (2006.01) |
| E21B 43/22 | (2006.01) |
| C04B 9/02 | (2006.01) |
| C09K 8/42 | (2006.01) |
| C09K 8/46 | (2006.01) |

(52) U.S. Cl.
USPC .......... 166/270; 166/292; 166/295; 166/300; 166/400; 106/685; 507/903

(58) Field of Classification Search
USPC ...................................................... 166/270
See application file for complete search history.

(56) References Cited

U.S. PATENT DOCUMENTS

| | | | | |
|---|---|---|---|---|
| 3,014,530 | A | * | 12/1961 | Harvey et al. ................. 166/293 |
| 3,482,634 | A | * | 12/1969 | Cox .............................. 166/292 |
| 3,658,129 | A | | 4/1972 | Lanning et al. |
| 4,009,755 | A | * | 3/1977 | Sandiford ..................... 166/270 |
| 4,683,949 | A | | 8/1987 | Sydansk et al. |
| 4,688,639 | A | * | 8/1987 | Falk ............................. 166/295 |

(Continued)

FOREIGN PATENT DOCUMENTS

| | | |
|---|---|---|
| CA | 2 243 900 | 7/1998 |
| CA | 2 349 998 A1 | 12/2001 |

(Continued)

OTHER PUBLICATIONS

International Search Report and Written Opinion of the Searching Authority for related application PCT/US2010/043730, mailed Oct. 19, 2010, 11 pages.

(Continued)

*Primary Examiner* — George Suchfield
(74) *Attorney, Agent, or Firm* — John L. Wood (57) ABSTRACT

A method for controlling driving fluid breakthrough caused by zones of pressure communication, i.e., a matrix bypass event ("MBE") or a wormhole, having a void space and possibly areas of enhanced permeability (a halo region) associated with the void space, within a subterranean formation arising from use of a driving fluid in reservoirs where heavy/viscous oil is being produced. In embodiments, the method includes injection of a slurry of a cementitious material into the zone, which upon setting, provides a cement plug in the void space that reduces the pressure communication and flow of driving fluid within the zone. Another step injects a gel precursor within the zone, which upon setting, produces a gel plug that also reduces pressure communication and driving fluid flow through the halo region of the zone.

33 Claims, 4 Drawing Sheets

U.S. PATENT DOCUMENTS

| | | | |
|---|---|---|---|
| 4,724,906 A | 2/1988 | Sydansk | |
| 4,730,675 A | 3/1988 | Wygant et al. | |
| 4,766,959 A | 8/1988 | Allison | |
| 4,809,781 A * | 3/1989 | Hoefner | 166/270 |
| 4,834,180 A | 5/1989 | Shu | |
| 5,181,568 A * | 1/1993 | McKown et al. | 166/293 |
| 5,947,644 A | 9/1999 | Gibbons et al. | |
| 6,024,167 A | 2/2000 | Irani | |
| 6,186,231 B1 | 2/2001 | Kalfoglou | |
| 6,228,812 B1 | 5/2001 | Dawson | |
| 6,450,260 B1 | 9/2002 | James et al. | |
| 6,664,215 B1 | 12/2003 | Tomlinson | |
| 6,720,292 B1 | 4/2004 | Zhou et al. | |
| 7,044,222 B2 | 5/2006 | Tomlinson | |
| 7,131,493 B2 | 11/2006 | Eoff et al. | |
| 7,243,720 B2 | 7/2007 | Ligthelm | |
| 7,299,882 B2 | 11/2007 | Brezinski et al. | |
| 7,328,743 B2 | 2/2008 | Turta et al. | |
| 7,350,572 B2 | 4/2008 | Fredd et al. | |
| 7,350,575 B1 | 4/2008 | Lewis et al. | |
| 7,350,576 B2 | 4/2008 | Robertson et al. | |
| 7,510,011 B2 | 3/2009 | Le Gloahec et al. | |
| 7,544,641 B2 | 6/2009 | Robertson et al. | |
| 7,588,081 B2 * | 9/2009 | Pfeiffer et al. | 166/252.5 |
| 7,677,313 B2 | 3/2010 | Tremblay et al. | |
| 7,954,549 B2 * | 6/2011 | Lende et al. | 166/293 |
| 2004/0177964 A1 * | 9/2004 | Girgenti | 166/294 |
| 2005/0159319 A1 | 7/2005 | Eoff et al. | |
| 2007/0125534 A1 | 6/2007 | Reddy et al. | |
| 2007/0169937 A1 * | 7/2007 | Allin et al. | 166/295 |
| 2007/0267191 A1 * | 11/2007 | Pfeiffer et al. | 166/252.5 |
| 2008/0110628 A1 | 5/2008 | Bosma et al. | |
| 2008/0125334 A1 * | 5/2008 | Burns et al. | 507/219 |
| 2008/0135243 A1 * | 6/2008 | Hodgins et al. | 166/270 |
| 2009/0143256 A1 * | 6/2009 | Welton et al. | 507/218 |
| 2010/0065273 A1 * | 3/2010 | Sawdon et al. | 166/293 |
| 2010/0200233 A1 * | 8/2010 | Yeh et al. | 166/276 |
| 2010/0224366 A1 * | 9/2010 | Lende et al. | 166/292 |
| 2012/0061082 A1 * | 3/2012 | Jensen | 166/305.1 |

FOREIGN PATENT DOCUMENTS

| | | |
|---|---|---|
| CA | 2 481 735 A1 | 3/2006 |
| CA | 2 519 039 | 3/2006 |
| EP | 0 272 709 A1 | 6/1988 |
| EP | 1 457 639 A1 | 9/2004 |

OTHER PUBLICATIONS

John Lee, "Well Testing", Texas A&M University, 1982, pp. 89 thru 99, New York, Dallas, Society of Petroleum Engineers of AIME, US, 13 pages.

B.A. Slevinsky, A Model for Analysis of Injection-Well Thermal Fractures, SPE 77568, Petro-Canada Oil and Gas Ltd., 2002, pp. 1 thru 9, San Antonio, Texas, Society of Petroleum Engineers Inc.

Bernard Tremblay, SPE, George Sedgwick, SPE, and Ken Forshner, Alberta Research Council, "Simulation of Cold Production in Heavy-Oil Reservoirs: Wormhole Dynamics", SPE Reservoir Engineering, May 1997, pp. 110 thru 117.

Dr. Mark A. Shand, Premier Chemicals, "Magnesia Cements", www.premierchemicals.com/corner/articles/cements.htm, 2 pages.

Halliburton, "Helping Reduce Production of Unwanted Water and Gas", Thermatek TM Integrated Products and Services, 16 pages.

* cited by examiner

METHOD TO CONTROL DRIVING FLUID BREAKTHROUGH DURING PRODUCTION OF HYDROCARBONS FROM A SUBTERRANEAN RESERVOIR

CROSS-REFERENCE TO RELATED APPLICATIONS

This application claims benefit of U.S. Provisional Patent Application Ser. No. 61/230,443, filed Jul. 31, 2009, the teachings of which are incorporated herein by reference in their entirety.

FIELD OF THE INVENTION

The present invention relates to a method for remediation and/or inhibition of driving fluid breakthrough during production of hydrocarbons, and in particular heavy/viscous oil, from a subterranean reservoir, such as where a pressure communication between an injection well and a production well arises during a waterflood operation.

BACKGROUND OF THE INVENTION

Many oil fields are comprised of reservoirs wherein the injection wells involved with a waterflood operation have or develop direct or indirect pressure communication with offset production wells. When this pressure communication develops, the producer well exhibits a breakthrough of injected water and thus an increase in the water oil ratio and decrease in oil production. The waterflood process is effectively broken as a result. This breakthrough of injection water is a serious disadvantage and becomes more prevalent as the oil field matures. A similar problem for a conventional waterflood of a light oil reservoir is generally described in U.S. Pat. No. 7,243,720.

As used herein, the term "viscous/heavy oil" (also simply "heavy oil" for ease of reference) means an oil of 30° API gravity or less, and generally less than 25° API. Some heavy oil reservoirs in the State of Alaska, USA or in Canada can exhibit a gravity of less than 17° API and as low as 10° API.

Though there may be communication, the injector well may still hold injection pressure suggesting that the flooding operation of the reservoir has not completely failed. Typically, the pressure difference between the bottom hole injection well pressure and the bottom hole production well pressure is on the order of 1000 to 2000 psi, and usually 1200 to 1500 psi in a normal heavy/viscous oil waterflood. When communication occurs, this pressure differential will decrease. In severe instances, such as a matrix bypass event or "MBE" (described in more detail hereinafter) frequently the waterflood will completely fail which is signified by the bottom hole injection pressure of the injector essentially equaling the bottom hole producing pressure of the producer.

A waterflood process may also be used for production of heavy/viscous oil from a reservoir combined with a cold production method wherein sand is produced with the water/oil mixture. This cold production method is sometimes referred to as a CHOPS (Cold Heavy Oil Production with Sand) method. Conventional waterflooding of heavy/viscous oil reservoirs is plagued with either very large pressure gradients or premature water breakthrough as previously mentioned, and both these aspects can lead to low injectivity or poor sweep efficiency, thereby resulting in poor oil recovery. Further, because of the increased viscosity of the heavy oil, it is susceptible to fingering. Sand production is not a major problem with production of heavy/viscous oil, since the wells are designed and operated, such as in the case of the CHOPS method, to produce sand with oil.

A particular characteristic of the CHOPS process which is a concern for waterflooding is the formation of so-called "wormholes" or channels which are formed as the fines are removed from the reservoir rock during production of the oil/sand mixture. An article by Tremblay et al. "Simulation of Cold Production in Heavy-Oil Reservoirs: Wormhole Dynamics", SPE Reservoir Engineering (May 1997) at pages 110-117, advises that fines removal causes the permeability of the rock to increase as the wormhole develops. In addition, the matrix of the rock becomes weaker and weaker as the process continues, even to the point where it is believed that a portion of the rock formation can fail and produce large volumes of sand and leave a "void" in the reservoir. Short of this event, the enhanced permeability rock where the fines have been removed is also sometimes called the "halo". Wormhole formation is described, for example, in U.S. Pat. No. 7,677,313, the teachings of which are incorporated herein by reference in their entirety. Wormholes may comprise either "void" spaces, "halo" regions, or both.

On the water injection side, those in the art can appreciate that so-called "fingering" of injected water through heavy oil also becomes a significant factor. The water fingering makes the waterflood process very inefficient.

When both producer and injector wells are active in a heavy/viscous oil water flood, it is believed, without wishing to be bound by theory, that a wormhole from the producer side seeks the relatively high pressure source of the injector well and correspondingly a water finger from the injector side seeks the lower pressure of the producer well. When this finger of water connects to the wormhole of the producer, the water-oil ratio of the produced fluids increases dramatically and there becomes a pressure communication between the injector and the producer.

Matrix Bypass Events (MBE's) as mentioned above are a particular problem in the waterflooding of many heavy/viscous oil reservoirs which use a cold production method, such as a CHOPS process. Basically the water injector well develops direct pressure communication with the oil production well. The presence of an MBE can be inferred in most cases where the difference in pressure between the bottom hole injection well pressure and the bottom hole production well pressure ($\Delta P_{bh}$) shows a significant decrease over a relatively short period of time, such as a change in $\Delta P_{bh}$ on the order of at least 100 psi over a 12 hour time period. In the most severe cases, the pressure differential ($\Delta P_{bh}$) can be less than 200 psi and even less than 100 psi, i.e., the bottom hole injection pressure of the water injector approaches and nearly equals the bottom hole production pressure of the producer. This short circuit of the injected water can make the waterflood ineffective and oil recovery not economically feasible, since the injector and producer are just primarily cycling water.

U.S. Pat. No. 7,677,313, previously incorporated herein by reference, discloses a method for controlling water influx into wellbores by blocking high-permeability channels. The method involves use of both an unreinforced and reinforced gel which is introduced into the channel to block the flow of water therethrough. U.S. Pat. No. 6,720,292 discloses the use of a reinforced clay gel to control fluid flow, while U.S. Pat. No. 7,350,572 discloses use of a mixture of a treatment fluid (gelled acid material) and a fiber to control fluid losses from a wellbore.

While some of these methods may block fluid flow, the materials employed may not provide a complete seal, or any blockage may only be temporary, resulting in a relatively rapid reoccurrence of fluid influx.

What is needed is a method which may be used to remediate or repair a zone, such as that associated with wormholes wherein a void space and associated halo region are created due to production of sand, as in the case of a CHOPS type cold production process, and have resulted in an undesired pressure communication between the production well and an associated drive fluid injection well. Such a method could be used to control fluid flow and restore the effectiveness of the associated flooding operation and increase the amount of hydrocarbons produced.

SUMMARY OF THE INVENTION

The foregoing objects and advantages may be attained by the present invention, which in one aspect is directed to methods for remediation of void spaces and/or halo regions within a high permeability zone of a subterranean formation, which void spaces or halo regions are formed by use of a driving fluid, such as a waterflood, during production of heavy/viscous oil from the formation.

Thus, in embodiments, the invention is directed to a method for remediation of a zone within a subterranean hydrocarbon-bearing formation to inhibit breakthrough of a driving fluid from a driving fluid injection well via the zone into a production well. The zone is comprised of a void space, a halo region, or both due to production of hydrocarbons from the production well. The zone thereby allows for pressure communication between the injection well and the production well. The method comprises the steps of:
  injecting a plugging composition into the zone, the plugging composition comprising a slurry of a cementitious material capable of being pumped into the zone;
  allowing the plugging composition to set in the zone for a time sufficient to form a cement plug therein to reduce flow communication of the driving fluid between the injection well and the production well through the zone;
  injecting a gel precursor into the zone; and
  allowing the gel precursor to set in the zone for a time sufficient to thereby form a plug comprised of a gel within the zone to further reduce flow communication of the driving fluid between the injection well and the production well.

In other embodiments, the invention is directed to a method for remediation of a zone within a subterranean formation bearing heavy/viscous oil to inhibit breakthrough of water from a water injection well via the zone into a production well. The zone is comprised of a void space, a halo region, or both within the zone due to production of the heavy/viscous oil through the production well. The zone thereby allows for pressure communication between the injection well and the production well. The method comprises the steps of:
  injecting a plugging composition into the zone via the injection well, the plugging composition comprising a slurry of a cementitious material capable of being pumped into the zone;
  allowing the plugging composition to set in the zone for a time sufficient to form a cement plug therein to reduce flow communication of water between the injection well and the production well through the zone;
  injecting a polymer gel precursor into the zone via the injection well;
  injecting a displacement fluid into the zone via the injection well to overdisplace the polymer gel precursor into the zone; and
  allowing the polymer gel precursor to set for a time sufficient to thereby form a plug comprised of the polymer gel within the zone to further reduce flow communication of water between the injection well and the production well.

Further aspects and advantages of the invention will become apparent to those skilled in the art from a review of the following detailed description taken in conjunction with the examples and the appended claims. It should be noted that the invention is susceptible to embodiments in various forms. Therefore, the specific embodiments described hereinafter are provided with the understanding that the present disclosure is intended as illustrative and is not intended to limit the invention to the specific embodiments described herein.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention is a method for controlling fluid flow within one or more high permeability zones within a subterranean formation which are in communication with a wellbore, wherein a "high permeability zone" is any path or channel which is in communication with a wellbore and which exhibits a significantly higher permeability to fluids than the average permeability of the formation surrounding the wellbore. In embodiments, the presence of a high permeability zone can be inferred where the communication between the high permeability zone and the wellbore results in a difference in bottom hole pressure between an injection well and a production well ($\Delta P_{bh}$) that shows a significant change in $\Delta P_{bh}$ over a relatively short period of time, such as on the order of at least 50 psi, and more particularly at least 100 psi, over a 12 hour time period. In the most severe cases, the pressure differential $\Delta P_{bh}$ can be less than 200 psi and even less than 100 psi, i.e., the bottom hole injection pressure of the water injector approaches and nearly equals the bottom hole production pressure of the producer. In terms of volume for such zone (such as a wormhole), the void space volume of the zone can be at least 10 barrels per 1000 feet of length for the most severe cases, and as little as 0.05 barrels per 1000 feet or less for less severe cases of pressure communication.

As one example, a high permeability zone may be comprised of one or more fractures or irregularities within the formation. As a second example, a high permeability zone may be comprised of one or more voids (or gaps) in the formation surrounding the wellbore or adjacent to the wellbore, which voids may be naturally occurring within the formation, but of primary interest in this invention for production of heavy/viscous oil, are voids formed during production of hydrocarbons from the wellbore. In some particular embodiments of the invention, the high permeability zones are comprised of wormholes, such as wormholes associated with heavy oil reservoirs which have been produced by the use of Cold Heavy Oil Production with Sand ("CHOPS") techniques.

These high permeability zones generally comprise a void space and also an area of enhanced permeability associated with the void space termed as a halo region. The halo region is believed to comprise porous, or loose or loosely compacted unconsolidated solid material. In some embodiments, the method of the invention preferably selectively blocks wormholes associated with cold production wells which have experienced water breakthrough and thus tend to produce relatively high percentages of water at the wellbore. It is believed that the treatment method of the invention will preferentially infiltrate wormholes which have experienced water breakthrough, due to the relatively low viscosity of water in comparison with the viscosity of hydrocarbons such as heavy oil. As a result, the method of the invention is particularly suited for use where the viscosity of the hydrocarbons being produced by the wellbore is relatively high, since these conditions will increase the extent to which the treatment method will preferentially infiltrate wormholes which contain a large proportion of water.

The reservoir formation surrounding such wormholes typically comprises a sand matrix of relatively densely compacted but unconsolidated sand. Heavy oil is contained within this sand matrix, and the permeability of the sand matrix is typically much lower than the permeability of either the void space or the halo region of the wormhole.

The method is comprised of a sequential treatment of two basic steps—one step being the introduction of a plugging composition comprised of a cementitious material into the high permeability zone, and a second step comprised of introducing a gel precursor into the zone. It is generally preferred that the initial step be introduction of the cementitious material into the zone, followed by introduction of the gel precursor. It is believed that the plugging composition comprised of the cementitious material, upon setting, primarily places a plug within the void space of the high permeability zone, while the gel precursor, upon setting, places a plug within the associated halo region of the zone.

Thus, the method of the invention can result in a treatment that provides a synergistic plug or seal combination which is particularly effective, for example, in the control of pressure communication and driving fluid flow between an injector and producer well pair in a driving fluid operation, such as a waterflood used to produce heavy/viscous oil.

Plugging compositions useful in the practice of this invention comprise a cementitious material. A variety of cementitious materials can be used, such as Portland-type cements and magnesium oxysulphate materials marketed under the tradename MAGNAPLUS by Baker Hughes. Sorel cements may also be used, which are comprised of magnesium oxychloride.

However, particularly useful cementitious materials are fast setting cements, such as those comprised of magnesium oxide, and particularly magnesium oxychloride cements as described in U.S. Pat. No. 6,664,215, previously incorporated herein by reference in its entirety. Similar fast setting cement compositions are disclosed in U.S. Pat. Nos. 7,544,641, 7,350,576 and 7,044,222 the teachings of which are also incorporated herein by reference. These materials are available commercially from Halliburton Energy Services Inc. under the trade name THERMATEK.

Particularly advantageous cementitious materials are those which undergo a rapid phase transition from a flowable slurry to a solid state as generally described in U.S. Pat. No. 6,664,215. This property is referred to in the art as a "right-angle set" because of the characteristic sharply-angled curve (i.e., resembling a "right angle") formed by plotting the viscosity of the material versus setting time. Such materials can also be relatively noninvasive to formations around the high permeability zone, because the rapid set limits migration of the cementitious material into such formations; however, some invasion of the slurry into areas surrounding the void space of a zone may be desired to assist with stabilizing the associated halo region of the zone.

As known in the art, various other components may be added to the cementitious material to impart desired properties prior to pumping it, such as fillers, inhibitors, accelerating agents, weighting agents, and strengthening agents.

The plugging composition is generally prepared as a slurry of the cementitious material at the wellsite. Generally, the composition is an aqueous slurry of the cementitious material. The composition may be prepared in a cement unit such as those manufactured by Halliburton, Baker Hughes or Schlumberger. Typical cement units include a vessel and mixing apparatus. The constituents of the composition may be mixed in batches or in a continuous mixing operation. The slurry of cementitious material may then be pumped and injected directly from the cement unit to the wellbore. Other suitable apparatus may be used to mix and pump the slurry to the wellbore. For example, the composition could be prepared in a tank of suitable volume, mixed with appropriate equipment and pumped and injected into the wellbore with a triplex or duplex rig pump. It is anticipated that the composition will be prepared at ambient temperature and pressure. Cooler temperatures will delay the ramp time to the internal composition temperature at which the composition sets to form a solid state material.

It is anticipated that the plugging composition may be injected into either an injector well or producer well, or both, depending upon which well has the best access to the high permeability zone in terms of the orientation of the well, the completion method used for the well, and also goal of the treatment. It is also been found advantageous to inject a pill of a viscous gel material, such as a gel with a viscosity significantly higher than the viscosity of the gel precursor described below used also in the practice of this invention, such as one with a viscosity of at least 500 cp or higher like a K-MAX cross-linked gel available from Halliburton Energy Services, both in advance of and after injection of the plugging composition. This overdisplaces the plugging composition into the formation and thereby reduces possible interference with the injector and/or producer wells, and it also places a viscous gel plug in front of and after the plugging composition so that it assists with maintaining the plugging composition in place within a desired location of the formation prior to setting of the cementitious material. However, in the event the zone volume to be treated is relatively small, such as about 3 barrels or less, it could be difficult to overdisplace the plugging composition due to a risk of pushing at least a portion of it out of the formation being treated.

Typically, after injection into the high permeability zone, the well is shut in and the plugging composition is solidified by geothermal heating of the slurry to the setting temperature for the composition whereupon it undergoes a phase transition from a flowable to a solid state. With some cementitious materials, such as the THERMATEK material previously described, during setting the composition undergoes an exothermic reaction and heat generated in the reaction assists with setting of the material. The amount of time required to set is thus dependent upon the cementitious material selected, but generally 24 hours is adequate. With some fast setting cements, such as the THERMATEK material previously described, the set time can be as little as 6 hours or less.

As mentioned above, the method of the invention further comprises introduction of a gel precursor material into the high permeability zone. The gel precursor may also be introduced to the high permeability zone via an injector or producer well, or both, depending upon which well has the best access to the high permeability zone in terms of the orientation of the well, the completion method used for the well, and also goal of the treatment.

Gel precursor materials employed in the practice of the invention can include any type of gel system, including a wide range of clay gels and chemical gels, or combinations thereof, but is most preferably employed using a polymer gel system.

Generally, the polymer gel precursor comprises a polymer gelling agent and a cross-linker. Polymer gel precursors useful in the present invention include those disclosed in U.S. Pat. Nos. 7,131,493 and 7,299,882, and also US Patent Application Publication 2005/0159319, the teachings of which are incorporated herein by reference. Another useful polymer gel material includes polyamide gels marketed by Halliburton Energy Services Inc. under the trade name H2ZERO and also described in detail within U.S. Pat. No. 7,131,493.

Also useful as a polymer gel precursor in accordance with the present invention are those disclosed in U.S. Pat. Nos. 4,683,949; 5,947,644; 6,186,231; 6,450,260; 7,328,743 and 7,510,011, and US Patent Application Publication 2008/0110628, the teachings of which are incorporated herein by reference, and particularly, the polyacrylamide based gels MARASEAL and MARCIT developed by Marathon and marketed by Tiorco LLC. The MARCIT gel is comprised of a relatively high molecular weight polyacrylamide gelling agent, while the MARA-SEAL gel is comprised of a relatively low molecular weight polyacrylamide gelling agent.

Where the gel includes a cross-linker, any cross-linker which is suitable for use with the selected gelling agent may be used. In embodiments where the gel is comprised of a polyacrylamide gel, the cross-linker may, for example, be comprised of chromium acetate.

Polymer gel precursors for treatment of halo regions will typically have a viscosity of from 20 to 100 cp, and in embodiments, generally from 30-60 cp.

The gel precursor may be further comprised of a reinforcing material. The reinforcing material may be comprised of any suitable solid reinforcing material, such as natural or synthetic particles or fibers. The reinforcing material may be comprised of sand. The sand may be comprised of produced sand or may be comprised of a graded sand product. The reinforcing material is preferably comprised of relatively fine particles in order to minimize the tendency of the reinforcing material to settle out from the reinforced gel, and preferably particles less than 100 mesh.

The gel precursor may be comprised of any amount of the reinforcing material which, upon setting, is effective to provide the desired properties of the resulting gel.

In embodiments, the method of the invention may be further comprised of the step of introducing an amount of a displacement fluid into the wellbore and preferably into the high permeability zone to overdisplace the gel precursor into the zone and away from the wellbore, so that upon setting the resulting gel plug does not interfere with subsequent operation of the wellbore. Preferably the displacement fluid is injected into the wellbore immediately after the gel precursor is introduced into the high permeability zone so that the gel precursor does not have an opportunity to "set" in or near the areas surrounding the wellbore. Where it is not necessary or desirable to overdisplace the gel precursor away from the wellbore and into the formation, the step of introducing the displacement fluid may be omitted.

The displacement fluid may be comprised of any fluid which is capable of displacing the gel precursor and which either can remain in the wellbore without interfering with the wellbore or can be flushed from the wellbore before interfering with the wellbore, such as water, alcohols (such as methanol), fuel oils like diesel fuel, and crude oil. Preferably the displacement fluid is comprised of water. More preferably the displacement fluid is comprised of produced water or formation water which is obtained from the wellbore to be treated according to the invention or from a different wellbore. In arctic environments, especially those such as in Alaska, where freezing of water in the wellbore adjacent to permafrost areas is a potential problem, it is advantageous to use a non-aqueous displacement fluid, or initially use water as the displacement fluid and then switch to a non-aqueous fluid, such as diesel fuel, to maintain a hydrostatic column in the wellbore during the shut in period while the gel sets.

Once the gel precursor is introduced into the zone, the method is further comprised of shutting in the wellbore following the treatment for a period of time in order to allow for setting (gelation) of the gel precursor. The period of time to set is generally 24 hours or longer.

Evaluation of the Severity of the Pressure Communication.

There are several techniques that may be used to evaluate the severity of the pressure communication and give guidance with design the treatment volumes and remediation methodology to be employed.

Tracer Testing. By injecting red dye, fluorescein, or other water soluble visual tracer solution into the injector well and after visually detecting the presence of the tracer in the produced fluids at the producer well, and thereafter taking samples of produced fluids at the producer well, it is possible to size the treatment for a repair. When a high permeability zone is present, the typical transit time from the perforations in the casing of the injector well to the perforations in the casing for the producer well is 20 to 40 minutes. This has an associated injected volume of 15-40 bbls of water with interwell distances of 1,000 to 1,400 feet. By the addition of a soluble chemical agent into the drive fluid, such as a water-soluble salt—for example about 1 pound of magnesium sulfate (Epsom salt—$MgSO_4.7H_2O$) per barrel of tracer solution (the salt is added with the red dye, fluorescein or other water soluble visual tracer)—it is possible to quantify the fraction of the tracer which is conveyed by the high permeability zone. Thus, once the red dye, fluorescein, or other visual tracer is detected in the produced fluid, samples can be taken at periodic intervals to quantify the fraction of the tracer that is immediately produced through the high permeability zone. Multiplication of the injection water volume required to move the tracer from the injector well perforations to the producer well perforations by the fraction of the tracer that is immediately produced from the producer well provides an estimate of the treatment volume.

Difference in Bottom Hole Pressure between the injector and producer wells. Estimation of the connectivity of the injector and producer is possible if there is a differential pressure gradient between the bottom hole pressures of the injector and the producer wells (on the same datum). A number of assumptions are made: 1.) all of the injected fluid is entering the high permeability zone (wormhole) at the injector well, 2.) the zone (wormhole) is configured in a roughly cylindrically shaped form with areas that permit the drive fluid to bleed into the surrounding formation (like a leaky drip hose), 3.) the zone (cylindrical shape) is divided into multiple sections for calculation of friction loss for flow within the zone; 4.) the leak-off of each section is proportional to the pressure difference between the reservoir pressure and the pressure in the section of the zone, 5.) the flow regime for each section is determined by the Reynolds Number, 6.) the pressure drop across each segment of the wormhole is calculated for the average parameters of that section, and 7) the fraction of tracer which is produced by the producer is the fraction of injection water immediately breaking through. By making these assumptions and using standard calculations, it is possible to determine an estimate of the equivalent diameter of the zone that matches the actual injection and production data and thereby obtain an estimate of the equivalent volume of the zone (wormhole) between the injector and producer.

A comparison of the two calculations (from tracer testing and differences in bottom hole injection pressure as described above) of the zone size provides guidance for sizing the treatment.

Interference Testing. This is a known reservoir analysis that injects water into the injection well and then the pressure response in the producer is monitored. Pressure interference testing is described generally by John Lee in his book *Well Testing*, Chapter 6, pps. 89-99 (1982 Soc. Of Pet. Eng., AIME). This test is preferably performed when the producer is shut in. The injector is pulsed (a period of injection followed by a shut-in period) and the resulting change of reservoir pressure is monitored in the producer well. Usually, the compressibility of the system is calculated assuming that it is nearly equal to the compressibility of water at 3e-6 vol/vol/psi. By assuming that the pressure is transmitted substantially in the water phase and that the compressibility of the water is 3e-6 vol/vol/psi, the effective permeability between the injector and the producer and the distance that the pressure is being transmitted through reservoir matrix can be determined by known calculations. Generally, wells where the injector is holding injection pressure will have a calculated distance for the pressure wave traveling through the reservoir rock which is close to the interwell distance. However, on many wells, the distance of the pressure wave being transmitted through the reservoir will be considerably less. This analysis gives two pieces of data:

First, the severity of the MBE (i.e. the KH measured on the Interference Test is greater than what is through to the KH of the reservoir).

Second, the length that the pressure wave is traveling through reservoir matrix. When the matrix flow distance is less than the interwell distance, it is assumed that the pressure wave is flowing through a void in a wormhole or MBE and/or a fracture induced by the injector well.

Fracture Length Determination. Formulations for predictions of hydraulic fracture lengths as reported in an article by Slevinsky, "A Model for Analysis of Injection Well Thermal Fractures" SPE 77568 (Annual Technical Conference & Exhibition, San Antonio, Tex. 29 Sep.-2 Oct. 2002), suggests evaluations for the Upper and Lower Limit Fracture Length according to equations as more fully described in the article:

$$L_{Upper} = 25.087 \sqrt{\frac{t\mu q^2}{F_d K \phi H^2 \Delta P}}$$

$$L_{Lower} = 25.087 \sqrt{\frac{\mu Q^2}{t F_d K \phi H^2 \Delta P}}$$

where:
L=fracture length in meters (m);
q=fluid injection rate (assumed constant) in $m^3$/day;
t=time of injection in days;
H=fracture height in m;
$\Delta P = P_{bottomhole} - P_{reservoir}$ in KPascals (KPa);
$\mu$=injection fluid viscosity in centipoise (cp);
$F_d$=damage factor due to plugging ($k_{eff}/k$);
k=formation permeability to injected fluid in millidarcies (md); and
Q=cumulative production in $m^3$.

The $F_d$ is the damage factor, while other parameters in the equations are discussed and defined in the Slevinsky article. Typically analysis of the injection data shows the growth of a fracture to a certain distance and thereafter growth of the fracture ends. Usually the decline or halt in growth of a fracture is often associated with an increased water production rate and/or water cut on an offset production well. By changing the value of the $F_d$ it is possible to match the interwell distance between the injector and the producer that has stopped the fracture growth.

In reality it is believed (without wishing to be bound to theory) that in waterflooding of viscous oil it is not a fracture that is created, but a finger of water in the viscous oil. The $F_d$ in this case is not the damage factor for a fracture, but for the bleed off of water from the water finger into the viscous oil. When the finger of water reaches maximum growth, the well pair is a candidate for treatment.

Severity of the connection. An important factor in designing the appropriate treatment is evaluation whether the connection has a "void" between the water injection well and the oil production well and also obtaining an estimate of the volume of the zone to be treated as previously described. As part of the pre-treatment diagnostics, a cross-linked polymer gel pill may be injected in the well and the resulting bottom hole pressure signature then monitored. The pressure signature as the cross-linked gel tracer leaves the wellbore can give an indication of whether the flow outside of the casing is in reservoir matrix rock or within a void which has been created within the reservoir. If the flow is in a void, the injection pressure will drop dramatically as the cross-linked polymer gel leaves the casing and penetrates into the formation. However, if the flow primarily occurs in the formation matrix, the gel will be sheared by the formation which will result in the pressure declining slowly, or perhaps increasing until the pressure starts to decline, with the pressure gradually declining as the pressure of the gel dissipates into the formation and away from the wellbore.

Figure 1:
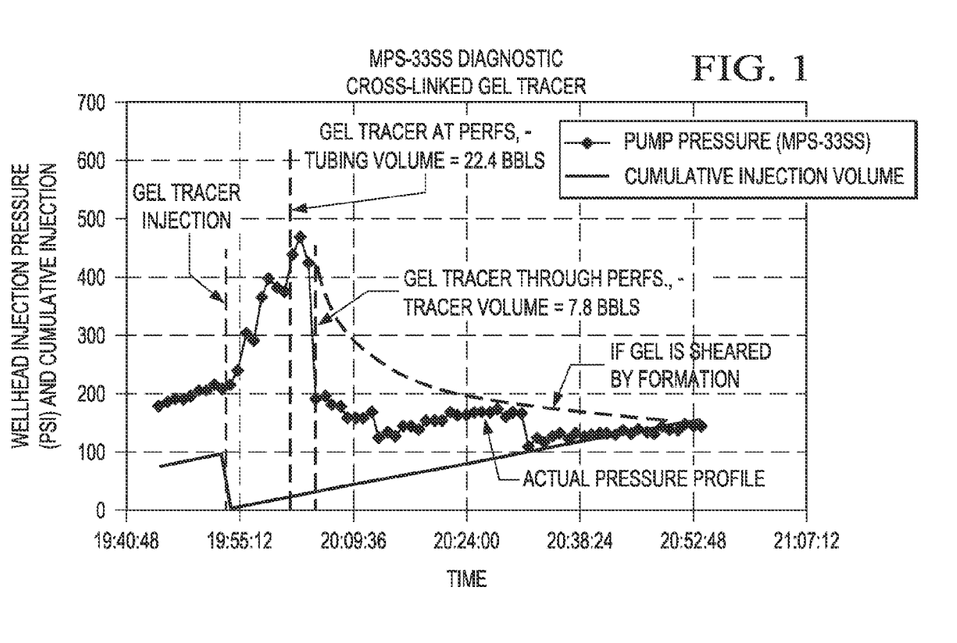
FIG. 1 is a graph of wellhead injection pressure (psi) and cumulative volume vs. time of an injection well and may be used to determine whether a high permeability zone has a void space.

FIG. 1 is a graph of wellhead injection pressure (psi) and cumulative volume vs. time data which illustrates the foregoing analysis for an injection well (MPS-33SS) discussed in the Comparative Example which develops a pressure communication and associated high water to oil ratio and decline in hydrocarbon production. The injection data can be used to analyze whether a high permeability zone has a void space, and the tracer and bottom hole pressure difference between injector and producer can be used to quantify the treatment volume as previously described. From the left side of the page on FIG. 1, the first vertical dashed line shows the point at which a cross-linked polyacrylamide gel is initially injected into the well; the next vertical dashed line shows the point at which the gel has filled the well tubing (the tubing volume being 22.4 bbls) and is at the perforations leading into the formation, and the third vertical dashed line shows the point at which the gel has passed through the perforations and into the formation (added tracer volume being 7.8 bbls). The curve associated with the diamond-shaped data points illustrates a pressure response in the event a void space exists within well MPS-33SS, while the dashed curve illustrates an anticipated pressure response that would be seen if there is a halo region and no void space. In this example, the actual data for the pressure curve indicates that the well has a high permeability zone with a void space therein. It is thus a candidate for treatment according to the invention.

SPECIFIC EMBODIMENTS OF THE INVENTION

The present invention is illustrated by the Example and Comparative Example which follow hereinafter.

Comparative Example

Injection of Cementitious Material Only (TK2)

In this Comparative Example, treatment of a high permeability zone is targeted at only filling what is believed to be the void space of a high permeability zone. Two injector/producer well pairs are identified as having catastrophic MBE related problems and likely candidates for remediation of the MBEs. The well pairs are—MPS-33LS to MPS-25 in Field A and MPS-33SS to MPS-23 in Field B. Prior to treatment, the production wells have a water cut of nearly 100%.

According to a tracer test as described above, the injection time for a tracer from the injector well to the producer well gives an indication of the volume of the tubing from the surface of the injection well to the perforations, and this assists with determining the amount of cementitious material to inject, as the volume of the void space associated with the MBE is relatively small. The tracer indicates a volume of about 23.1 bbls for MPS-33LS to MPS-25 and 42.3 bbls between MPS-33SS to MPS-23, and when bleed-off of the injected water from the void is accounted for in both cases, the MBE calculates to be only about 11 bbls in volume.

A pill of a slurry of fast setting cementitious material (THERMATEK—available from Halliburton Energy Services Inc.) is used as a plugging composition and is injected into the zone via the injection wells to seal the "void" space. As the cement is heavier than water, a pill of a viscous gel (K-MAX gel with a viscosity of about 700 centipoise (cp) available from Halliburton Energy Services) is pumped both in front of and behind the cement to hold it in place for the 1-2 hours as required for the cement to set. However, only 1 bbl of the viscous gel is used to overdisplace the cement into the formation to minimize the possibility of displacing the cement out of the formation and into the producer well, and also 1 bbl of viscous gel is left in the wellbore to keep the fluid level from dropping after the job is finished and while the well is shut in to set the cementitious material.

Alternatively, fluids such as those used as a displacement fluid as previously described, may be introduced in the wellbore to keep a hydrostatic column of fluid in the wellbore and thereby keep the fluid level from dropping during the shut in period. In arctic environments, especially those such as in Alaska, where freezing of water in the wellbore adjacent to permafrost areas is a potential problem, it is also advantageous to use a non-aqueous fluid for this purpose, or initially use water and then switch to a non-aqueous fluid, such as diesel fuel, to maintain the hydrostatic column while the plugging composition sets.

Figure 2:
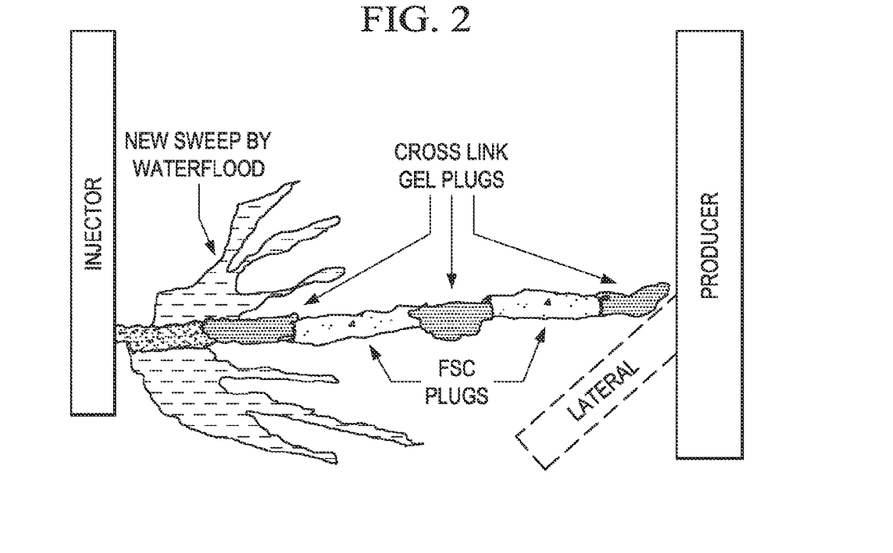
FIG. 2 is a section view of a formation bearing heavy/viscous oil which has a zone remediated according to the invention with both cross-linked polymer gel plugs and plugs of a cementitious material (THERMATEK) according to an embodiment of the invention described in the Example discussed hereinafter.

In the Comparative Example, the cement pill is also divided into two parts with a 1 bbl pill of the viscous gel pumped in between the two parts. This is done to insure that there is gel on both sides of the cement plug, so that the cement is held in place for the time required for the cement to set. The injection of these components of the treatment and placement of the resulting plugs is depicted in FIG. 2.

Thereafter the two well pairs are placed back into production mode. The results of this Comparative Example show that placement of the cement plugs remediated the pressure communication between the injector and producer pairs on a temporary basis with water cuts of from 50 to 70%, with MPS-33-SS lasting 39 days and MPS-33LS 50 days before water communication appears again.

The following Table 1 shows a summary of data for this Comparative Example.

TABLE 1

Data for Comparative Example
Treatment of MBE "void" with THERMATEK ® Cement

|  |  | Injector: | |
|---|---|---|---|
|  |  | MPS-33SS | MPS-33LS |
|  |  | Producer: | |
|  |  | (MPS-23p) | (MPS-25p) |
| X/L Cross-Linked Gel | Bbls | 2.5 | 2.5 |
| Foamed Fast Setting Cement (TK1) | Bbls |  |  |
| Neat Fast Setting Cement (TK 1 & 2) | Bbls | 7.5 | 4.0 |
| X/L Cross-Linked Gel (TK2) | Bbls | 1.0 | 1.0 |
| Neat Fast Setting Cement (TK2) | Bbls | 7.5 | 4.0 |
| X/L Cross-Linked Gel | Bbls | 1.0 | 1.0 |
| Water Over Displacement | Bbls | 0.0 | 0.0 |
| Fluid Level Drop | Bbls | 0.0 | 0.0 |
| X-L Cross-Linked Gel left in Wellbore | Bbls | 1.0 | 1.0 |

TABLE 1-continued

Data for Comparative Example
Treatment of MBE "void" with THERMATEK ® Cement

| | | Injector: | |
| --- | --- | --- | --- |
| | | MPS-33SS | MPS-33LS |
| | | Producer: | |
| | | (MPS-23p) | (MPS-25p) |
| Diagnostic of MBE Size: | | | |
| Pumped Vol (to show up at producer) | Bbls | 42.3 | 23.1 |
| Bleed Off Factor (Bbl Inj Water to Formation/Bbl. Inj.) | | 0.74 | 0.53 |
| MBE Volume | Bbls | 11.0 | 10.9 |
| Inj/Producer Distance | Feet | 925 | 1400 |
| Volume--Csg. to Fast Setting Cement Plug | Bbls. | 1.0 | 1.0 |

Figure 3:
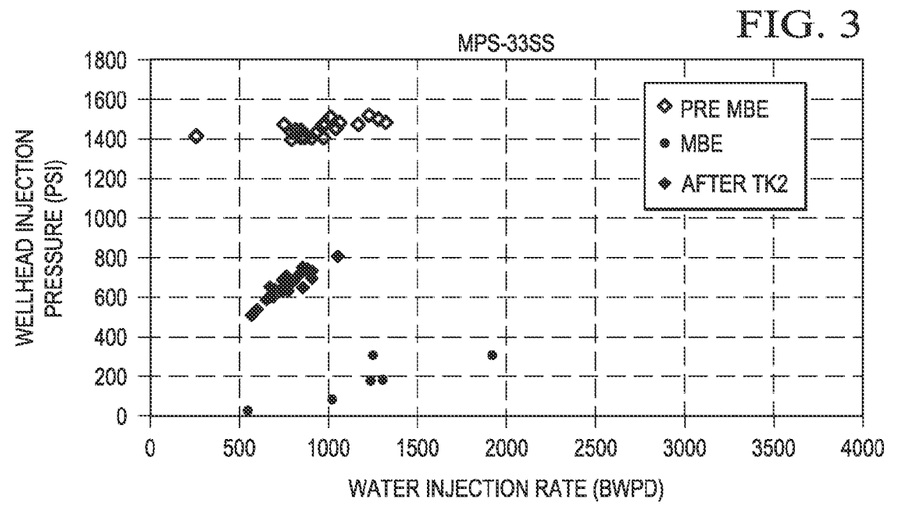
FIG. 3 is a graph of wellhead pressure (psi) vs. injection rate (BWPD) prior to and after breakdown, and also after treatment, for well MPE-33SS discussed hereinbelow in respect of the Comparative Example discussed hereinafter.
Figure 4:
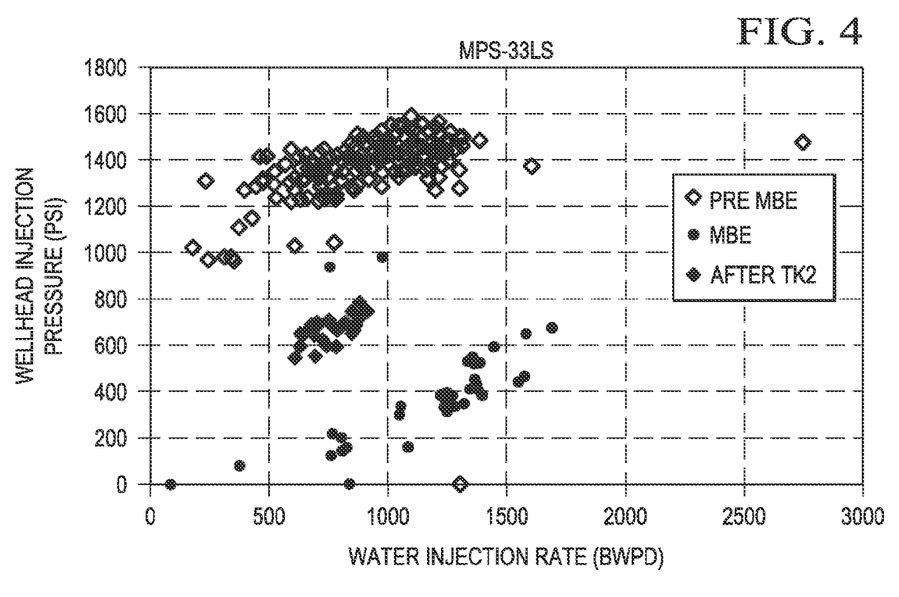
FIG. 4 is a graph of wellhead pressure (psi) vs. injection rate (BWPD) prior to and after breakdown, and also after treatment, for well MPS-33LS discussed hereinbelow in respect of the Comparative Example discussed hereinafter.
Figure 5:
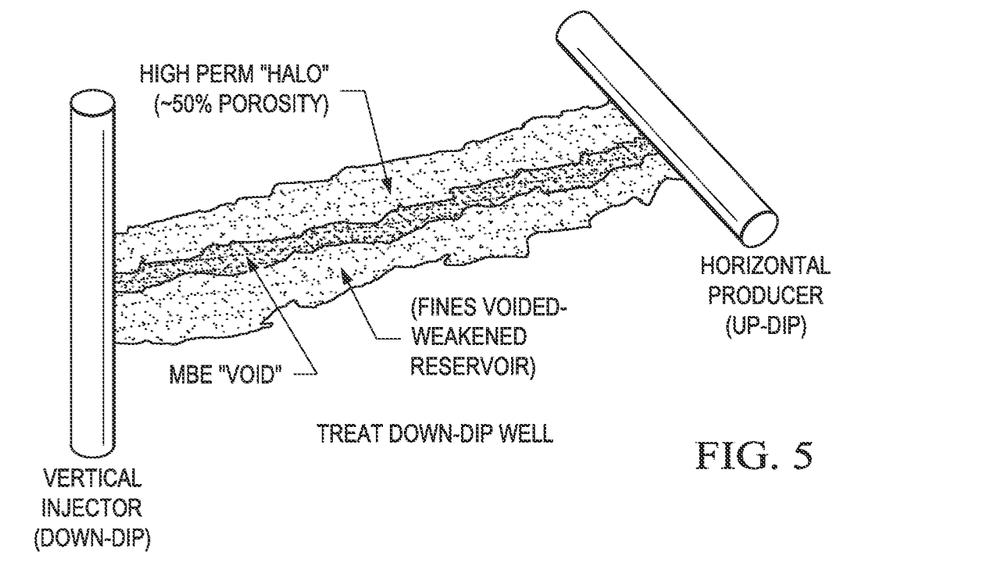
FIG. 5 is a section view of a formation bearing heavy/viscous oil (up-dip) which according to the analysis methodology discussed hereinafter, has been determined to have a void space ("MBE") and associated halo region that require remediation with both cross-linked polymer gel plugs and plugs of a cementitious material (THERMATEK) according to an embodiment of the invention.

FIGS. 3 and 4 show the performance of the injectors before the MBE's occur, how the wells performance changes after the MBE occur, and how the wells perform after conducting the procedure of the Comparative Example (TK2).

Example

Remediation of High Permeability Zone Using Combined Cement and Gel Treatments

The procedure of the Comparative Example is substantially repeated to place the cement plugs into the void space of the high permeability zones within the two injector and producer well pairs. After treatment, the cement plugs are placed into the zone substantially as depicted in FIG. 2. It is believed that this step essentially plugs pressure communication between the injection wells and production wells through the void space of the zone.

While placement of the cement plugs results in some success, pressure communication between the injector and producer pairs appears again after a relatively short period of 39 and 50 days respectively for the two well pairs, as previously indicated in the Comparative Example. A red dye tracer test is again run on the injector and producer well pairs, together with pressure interference testing, which confirms the presence of what is believed to be an associated halo region which also provides a source of pressure communication.

Thus, after placing the cement plugs, an additional step is conducted by injecting a gel precursor into the zone that is directed toward plugging the associated halo region believed to exist within the zone and adjacent to the former void space now plugged by the cement plugs. A polyamide gel precursor—H2ZERO® gel system obtained from Halliburton—is used to place a polymer gel plug into the halo region after the polyamide gel precursor has set. Water is injected as a displacement fluid to overdisplace the gel precursor into the zone and avoid potential interference of the resulting gel plug with the wellbore and subsequent operation of the well.

After treatment, the wells are placed back into production mode, and the pressure communication is remediated with water cuts of from 50% to 70% that last for a year.

Figure 6:
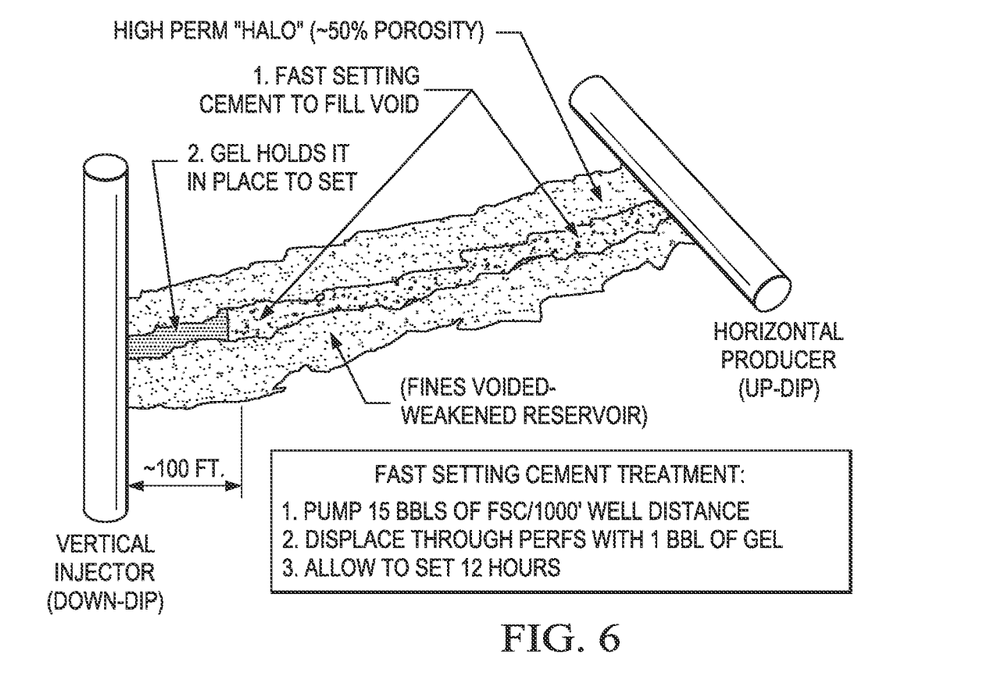
FIG. 6 is a section view of the formation bearing heavy/viscous oil depicted in FIG. 5, which shows remediation of the void space ("MBE") according to one embodiment of the invention, i.e., with a plug of a cement-like material (THERMATEK). Prior to setting, the cementitious material is held in place with a plug of a polymer gel as is shown in FIG. 6.
Figure 7:
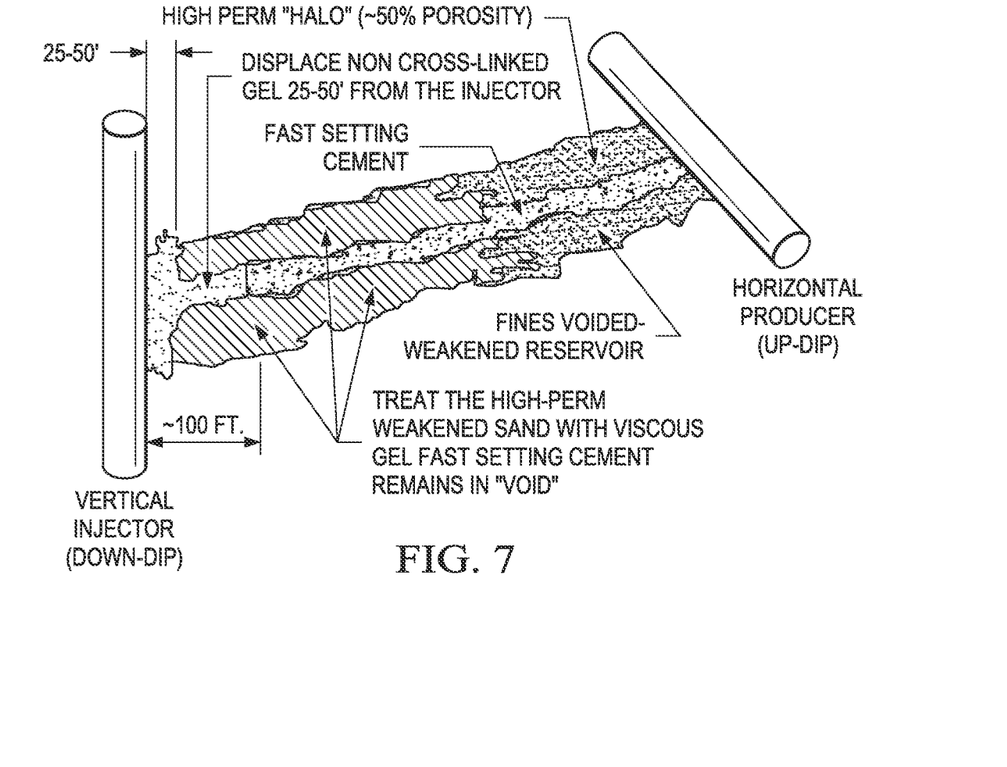
FIG. 7 is a section view of the formation bearing heavy/viscous oil depicted in FIG. 6, which shows further remediation of the halo region associated with the void space ("MBE") according to another embodiment of the invention. The halo region is remediated by injection of a gel precursor into the zone containing the halo region.
Figure 8:
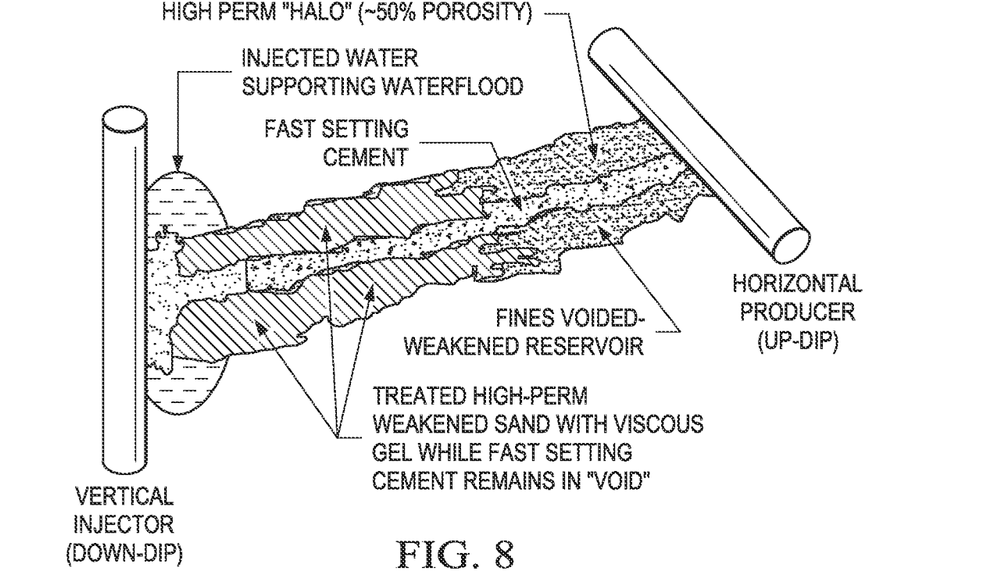
FIG. 8 is a section view of the formation bearing heavy/viscous oil depicted in FIG. 7 when waterflood is resumed after remediation of both the void space and halo region according to an embodiment of the invention.

FIGS. 5-8 illustrate further embodiments of the present invention that show the various steps from an initial assessment of the formation problem (FIG. 5), remediation of an MBE (in an up-dip orientation) as shown in FIG. 6, remediation of its associated halo (FIG. 7), and finally return of the injector well back to normal injection mode (FIG. 8).

Thus, the following procedure outlines an embodiment of the invention which may be used to remediate pressure communication of a high permeability zone comprised of both a void space and halo region:

Evaluate the severity of the MBE with:
Interference testing the injector and producer well pair
Determine KH of injector-producer well pair
Determine extent of matrix flow
Tracer test with water soluble tracer and a soluble compound (such as magnesium sulfate) to quantify the volume of the zone to be treated
Determine injector-producer transit time and associated injected volumes, and also fraction of tracer which breaks through to the producer after a period of two days.
Determine the difference in pressure between the injector well bottom hole pressure and the producer well bottom hole pressure to estimate volume of zone to be treated. Compare to the volume estimate obtained by the tracer analysis and adjust as needed.
Use transit times and associated volumes and the fraction of the tracer which breaks through, to size following stage treatment size
Pump a cross-linked gel pill to:
Determine volume of the tubing
Determine if void space is on the backside of the injector
Treatment Stage 1: Pump cementitious material pill to form a plug which blocks the void space
Repeat the diagnostics as set forth above to characterize the halo region
Treatment Stage 2: Pump a gel precursor pill to place a gel plug to remediate the halo region
Overdisplace the gel precursor pill with displacement fluid (water) to avoid interference and protect an ability to inject into the well after the treatment.

While the foregoing is directed to embodiments of the present invention, other and further embodiments of the invention may be devised without departing from the basic scope thereof, and the scope thereof is determined by the claims that follow.

What is claimed is:

1. A method for remediation of a zone within a subterranean hydrocarbon bearing formation to inhibit breakthrough of a driving fluid from a driving fluid injection well via the zone into a production well, the zone comprised of void space, a halo region, or both due to production of hydrocarbons from the production well, the zone thereby allowing for pressure communication between the injection well and the production well, which method comprises the steps of:
    injecting a plugging composition into the zone, the plugging composition comprising a slurry of a cementitious material capable of being pumped into the zone;
    allowing the plugging composition to set in the zone for a time sufficient to form a cement plug therein to reduce flow communication of the driving fluid between the injection well and the production well through the zone;
    injecting a gel precursor into the zone; and
    allowing the gel precursor to set therein for a time sufficient to thereby form a plug comprised of a gel within the zone to further reduce flow communication of the driving fluid between the injection well and the production well.

2. The method of claim 1 wherein the plugging composition is injected into the zone via the injection well, the production well, or both.

3. The method of claim 1 wherein the plugging composition is injected into the zone via the injection well.

4. The method of claim 1 further comprising injecting a displacement fluid into the zone to overdisplace the gel precursor into the zone.

5. The method of claim 4 wherein the displacement fluid is selected from water, alcohols, fuel oil or crude oil.

6. The method of claim 4 wherein the displacement fluid is water.

7. The method of claim 1 wherein the gel precursor is injected into the zone via the injection well, the production well, or both.

8. The method of claim 1 wherein the gel precursor is injected into the zone via the injection well.

9. The method of claim 1 wherein the gel precursor yields a chemical gel.

10. The method of claim 1 wherein the gel precursor yields a polymer gel.

11. The method of claim 10 wherein the polymer gel is a polyamide.

12. The method of claim 10 wherein the polymer gel comprises a polyacrylamide.

13. The method of claim 10 wherein the polymer gel comprises a cross-linked polyacrylamide.

14. The method of claim 13 wherein the polymer gel is cross-linked with chromium acetate.

15. The method of claim 10 wherein the gel precursor has a viscosity of from 20 to 100 centipoise (cp).

16. The method of claim 10 wherein the gel precursor has a viscosity of from 30 to 60 centipoise (cp).

17. The method of claim 1 wherein the slurry is an aqueous slurry.

18. The method of claim 1 wherein the cementitious material is comprised of magnesium oxide.

19. The method of claim 1 wherein the cementitious material is comprised of magnesium oxychloride.

20. The method of claim 19 wherein the slurry comprises from 30 to 70% by weight of magnesium oxychloride and 70 to 30% by weight water.

21. The method of claim 1 wherein the driving fluid is water.

22. The method of claim 1 wherein the zone is comprised of a wormhole resulting from a cold production process.

23. A method or remediation of a zone within a subterranean formation bearing heavy/viscous oil to inhibit breakthrough of water from a water injection well via the zone into a production well, the zone comprised of a void space, a halo region, or both, within the zone due to production of the heavy/viscous oil through the production well, the zone thereby allowing for pressure communication between the injection well and the production well, which method comprises the steps of:
   injecting a plugging composition into the zone via the injection well, the plugging composition comprising a slurry of a cementitious material capable of being pumped into the zone;
   allowing the plugging composition to set in the zone for a time sufficient to form a cement plug therein to reduce flow communication of water between the injection well and the production well through the zone;
   injecting a polymer gel precursor into the zone via the injection well;
   injecting a displacement fluid into the zone via the injection well to overdisplace the polymer gel precursor into the zone; and
   allowing the polymer gel precursor to set for a time sufficient to thereby form a plug comprised of the polymer gel within the zone to further reduce flow communication of water between the injection well and the production well.

24. The method of claim 23 wherein the displacement fluid is selected from water, alcohols, fuel of or crude oil.

25. The method of claim 23 wherein the displacement fluid is water.

26. The method of claim 23 wherein the polymer gel comprises a polyamide.

27. The method of claim 23 wherein the polymer gel comprises a polyacrylamide.

28. The method of claim 23 wherein the gel precursor has a viscosity of from 30 to 60 centipoise (cp).

29. The method of claim 23 wherein the Slurry is an aqueous slurry.

30. The method of claim 23 wherein the cementitious material is comprised of magnesium oxychloride.

31. The method of claim 30 wherein the slurry comprises from 30 to 70% by weight of magnesium oxychloride and from 70 to 30% by weight water.

32. The method of claim 23 wherein the zone is comprised of a wormhole resulting from a cold production process.

33. The method of claim 23 wherein the cementitious material is comprised of magnesium oxide.

* * * * *